(12) United States Patent
Hsu

(10) Patent No.: US 8,081,446 B2
(45) Date of Patent: Dec. 20, 2011

(54) NOTEBOOK COMPUTER

(75) Inventor: Sheng-Chieh Hsu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 248 days.

(21) Appl. No.: 12/560,444

(22) Filed: Sep. 16, 2009

(65) Prior Publication Data
US 2010/0290179 A1 Nov. 18, 2010

(30) Foreign Application Priority Data
May 13, 2009 (CN) .......................... 2009 1 0302270

(51) Int. Cl.
H05K 5/00 (2006.01)
H05K 7/00 (2006.01)
(52) U.S. Cl. ......... 361/679.55; 361/679.23; 361/679.26; 361/679.27; 361/679.59
(58) Field of Classification Search ............. 361/679.55, 361/679.23, 679.59, 679.26, 679.27
See application file for complete search history.

(56) References Cited

U.S. PATENT DOCUMENTS

| | | | | |
|---|---|---|---|---|
| 5,583,744 A * | 12/1996 | Oguchi et al. | ........... | 361/679.58 |
| 6,078,497 A * | 6/2000 | Derocher et al. | ........ | 361/679.55 |
| 6,097,592 A * | 8/2000 | Seo et al. | ................. | 361/679.55 |
| 6,768,637 B1* | 7/2004 | Amemiya | ................ | 361/679.55 |
| 6,930,881 B2* | 8/2005 | Karidis et al. | ........... | 361/679.55 |
| 7,929,298 B2* | 4/2011 | Hsu | ........................... | 361/679.59 |

* cited by examiner

Primary Examiner — Anthony Haughton
(74) Attorney, Agent, or Firm — Altis Law Group, Inc.

(57) ABSTRACT

A notebook computer includes a base, a display pivotably connected to a back of the base, and two brackets rotatably engaged with two side of the notebook computer. The two brackets can be rotated to from a rotating path. The rotating path includes a first position and a second position. At the first position, the two brackets are received in two sides of the display. At the second position, a top of each bracket extends out of the base to lift up the back of the base.

9 Claims, 8 Drawing Sheets

NOTEBOOK COMPUTER

BACKGROUND

1. Technical Field

The present disclosure relates to computers, and particularly to a notebook computer.

2. Description of Related Art

Notebook computers are increasingly used by people. Ordinarily, a bottom of the notebook computers and a keyboard area of the notebook computers are level. It is uncomfortable for operators to use a keyboard which is level.

DETAILED DESCRIPTION

Figure 1:
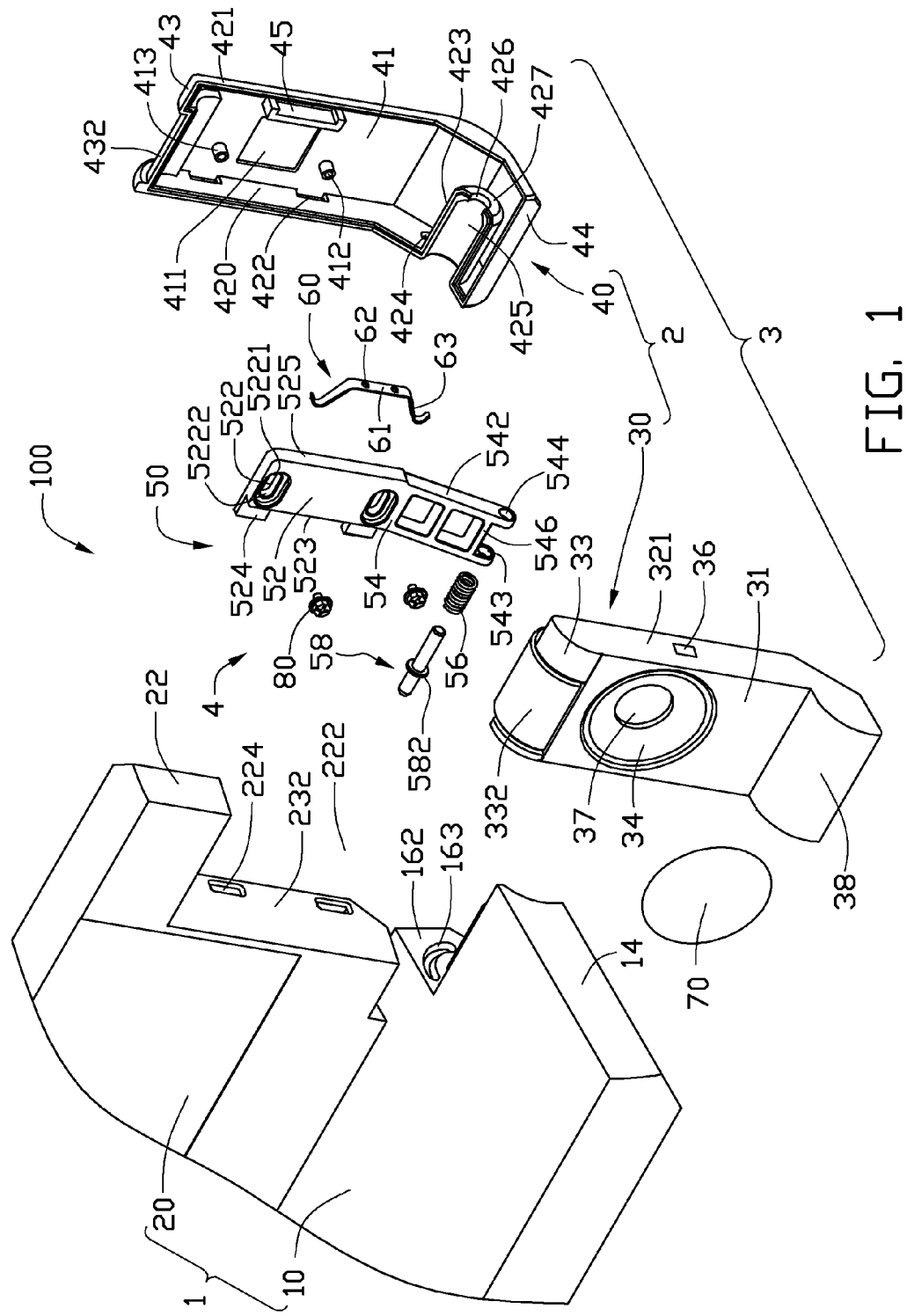
FIG. 1 is a partial, exploded, isometric view of an exemplary embodiment of a notebook computer, the notebook computer including a main body and two brackets, each bracket including a front cover.
Figure 2:
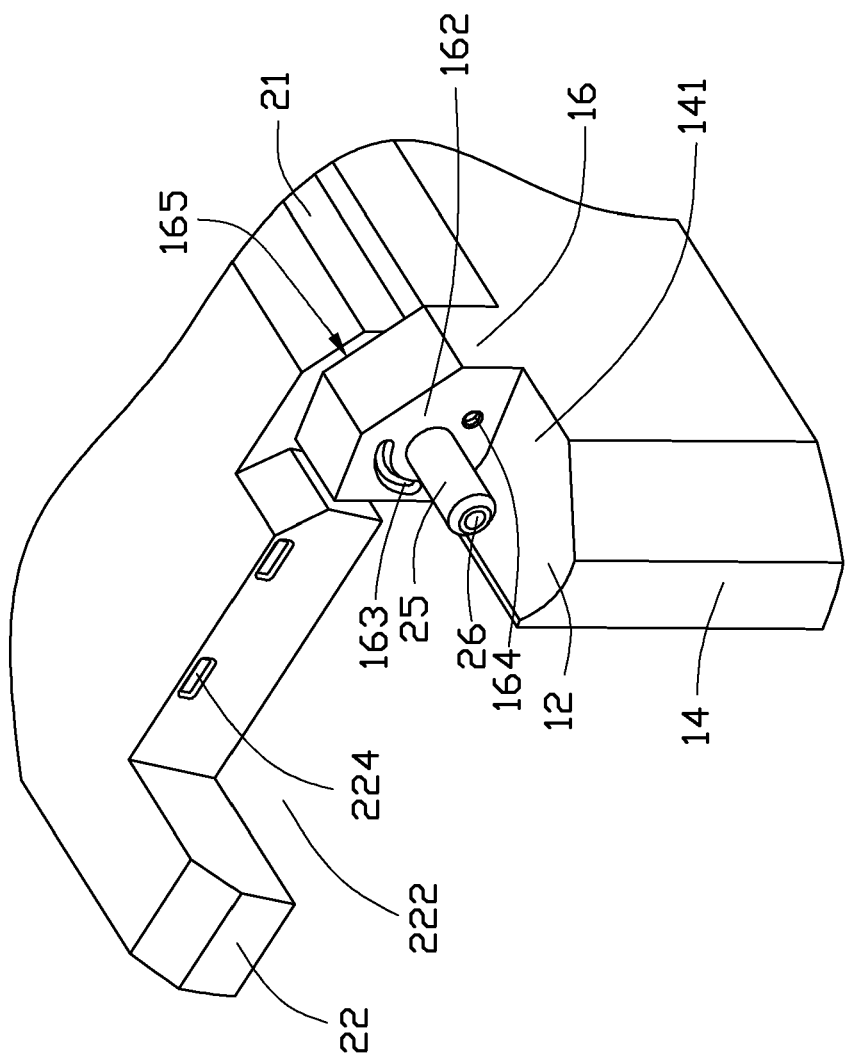
FIG. 2 is a partial, isometric view of the main body of FIG. 1, but viewed from another perspective.
Figure 3:
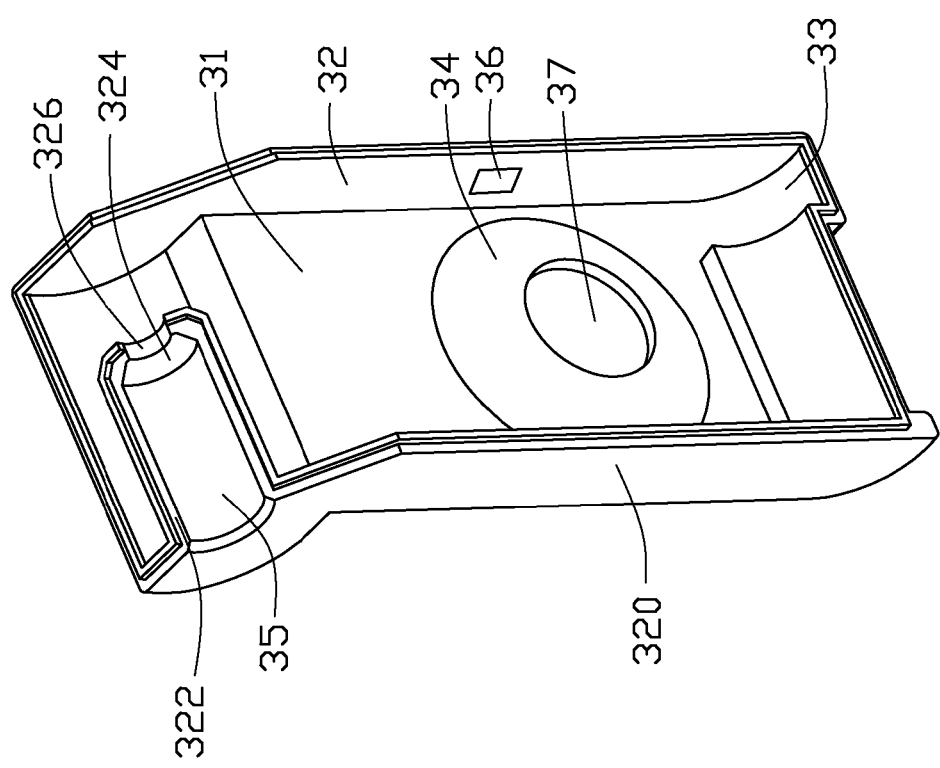
FIG. 3 is an isometric view of the front cover of FIG. 1, but viewed from another perspective.

Referring to FIGS. 1-3, an exemplary notebook computer 100 includes a main body 1 and two brackets 3 (only one bracket 3 is shown in FIG. 1) located at opposite sides of the main body 1. The main body 1 includes a base 10, a display 20 pivotably connected to the base 10.

The base 10 includes a back wall 12 and two sidewalls 14 perpendicularly extending frontward from opposite ends of the back wall 12. Two protrusions 16 substantially perpendicularly extend from the back wall 12, adjacent to the sidewalls 14, respectively. Each protrusion 16 includes a first surface face 165 facing the other protrusion 16, and a second surface 162 opposite to the first surface 165. A first receiving space 141 is bounded by the second surface 162 of each protrusion 16 and the back wall 12. The display 20 is pivotably connected to the back wall 12 of the base 10 via a pole 25 passing through each protrusion 16 and a bottom 21 of the display 20, and two ends of the pole 25 protrude into the corresponding first receiving spaces 141. A fixing hole 26 is axially defined in each end of the pole 25, to engage with the corresponding bracket 3. A quarter-circled sliding slot 163 is defined in the second surface 162 of each protrusion 16, around the pole 25. A locating hole 164 is defined in the second surface 162 of each protrusion 16, opposite to the sliding slot 163 across the pole 25.

Two second receiving spaces 222, corresponding to the two brackets 3, are defined in opposite sidewalls 22 at the bottom of the display 20. Two slots 224 are defined in a sidewall 232 bounding each second receiving opening 222.

The configuration and the function of the two brackets 3 are the same, therefore, taking one bracket 10 as an example to describe the configuration and the function of the brackets 3. The bracket 3 includes a shell 2 and a locating device 4 received in the shell 2. The bracket 3 is operable to be located at one of first to third positions of the shell 2. The shell 2 includes a front cover 30 and a back cover 40 engaged with the front cover 30.

The front cover 30 is substantially J-shaped. The front cover 30 includes a front board 31, an arc-shaped top board 33 extending upward and backward from a top of the front board 31, an arc-shaped bottom board 38 extending downward and forward from a bottom of the front board 31, a first side board 320 and a second side board 321 extending backward from opposite sides of the front board 31, the top board 33, and the bottom board 38, and a transparent shield 70. A taper-shaped depressed portion 34 is defined in the front board 31, and a through hole 37 is defined in a bottom of the depressed portion 34, to receive a light emitter diode (LED, not shown). A switch 36 which is connected to the LED is mounted to the second side board 321, to be operable to turned on or turn off the LED. A semicircular-shaped first receiving portion 322 axially defining a recessed portion 35 extends perpendicularly from the first side board 320 near the bottom board 38 towards the second side board 321. A semicircular-shaped first through hole 326 is defined in a bottom 324 facing the second side board 321 of the first receiving portion 322. A latching portion 332 is mounted to a top of the top board 33 to latch with the back cover 40.

The back cover 40 is substantially J-shaped. The back cover 40 includes a back board 41, an arc-shaped top board 43 extending upward and forward from a top of the back board 41, a bottom board 44 extending downward and forward from a bottom of the back board 41, a first side board 420 and a second side board 421 extending forward from opposite sides of the back board 41, the top board 43, and the bottom board 44. A quadrate-shaped opening 411 is defined in the back board 41. Two posts 413 axially defining two screw holes 412 are formed on the back board 41, and located above and below the opening 411 respectively, to fix the locating device 4. Two receiving holes 422 are defined in the first side board 420, adjacent to the back board 41, and corresponding to the slots 224 of a corresponding receiving space 222 of the display 20. A semicircular-shaped second receiving portion 423 axially defining a recessed portion 425 extends perpendicularly from the first side board 420 near the bottom board 44 towards the second side board 421. A semicircular-shaped second through hole 426 is defined in a bottom 427 facing the second side board 421 of the second receiving portion 423. A hole 424 is defined in the first side board 420, above and near the second receiving portion 423, corresponding to the locating hole 164 of the base 10. A fixing block 45 is formed on an inner side of the second side board 421 near the opening 411. Two pins 482 are mounted on a top of the fixing block 45. A latching slot 432 is defined in a top of the top board 43, to latch with the latching portion 332 of the front cover 30, to latch the back cover 40 to the front cover 30.

The locating device 4 includes a fixing element 50, a locating element 58 engaged with the fixing element 50, a spring 56, and an elastic element 60 resisted against the fixing element 50.

The fixing element 50 includes a first fixing portion 52 and a second fixing portion 54 slantingly extending from a bottom of the first fixing portion 52.

Two sliding holes 522, each horizontally elongated, are defined in the first fixing portion 52, adjacent to a top and the bottom of the first fixing portion 52, and corresponding to the posts 413 of the back cover 40, each to allow the corresponding post 413 to slide between a first terminal 5221 and a second terminal 5222 of the sliding hole 522. Two blocks 524 extend from a first side 523 of the first fixing portion 52, adjacent to the top and the bottom of the first fixing portion 52, corresponding to the receiving holes 422 of the back board 41 and the slots 224 of the display 20. An operation portion 528 (see FIG. 5) is mounted to a back side 527 (see FIG. 5) of the first fixing portion 52, corresponding to the opening 411 of the back cover 41.

The second fixing portion 54 includes two legs 542 extending downward and forward from opposite sides of the bottom of the first fixing portion 52, and two connection portions 546 connected between the legs 542 to reinforce the legs 542. Two shaft holes 543 and 544 are respectively defined in bottoms of the legs 542, to allow the locating element 58 to pass therethough.

The locating element 58 is column-shaped. A stopping portion 582 protrudes from a circumference of the locating element 58, adjacent to a first end of the locating element 58. A distance between the stopping portion 582 and a second end opposite to the first end of the locating element 58 is about equal to a distance between the shat holes 543 and 544.

The elastic element 60 includes a main wall 61 and two sidewalls 63 slantingly extending from opposite ends of the main wall 61. Distal ends of the sidewalls 63 may be U-shaped. Two holes 62 are defined in the main wall 61, corresponding to the pins 428 of the fixing block 45.

Figure 4:
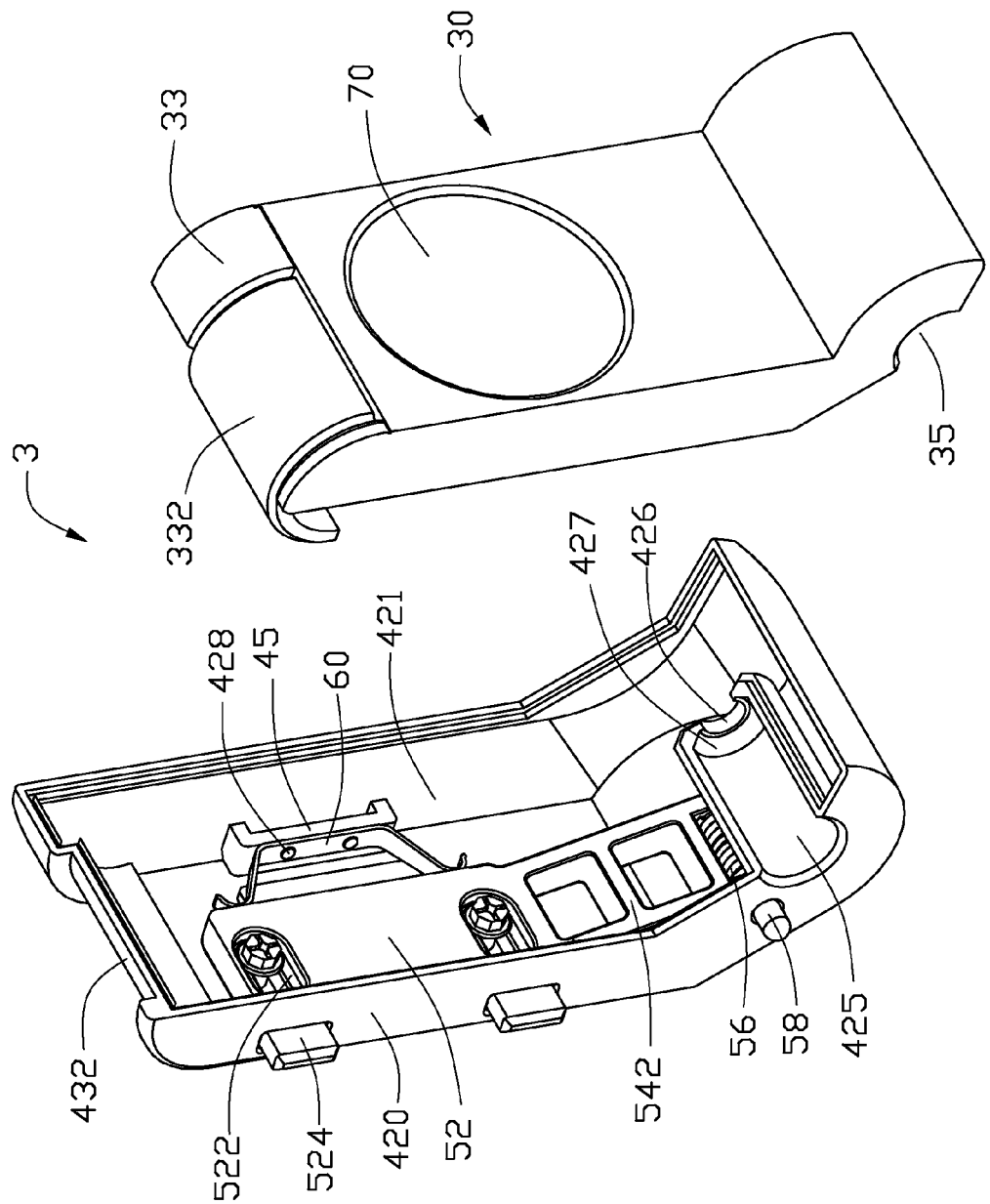
FIG. 4 is a partially assembled, isometric view of one of the two brackets of FIG. 1.
Figure 5:
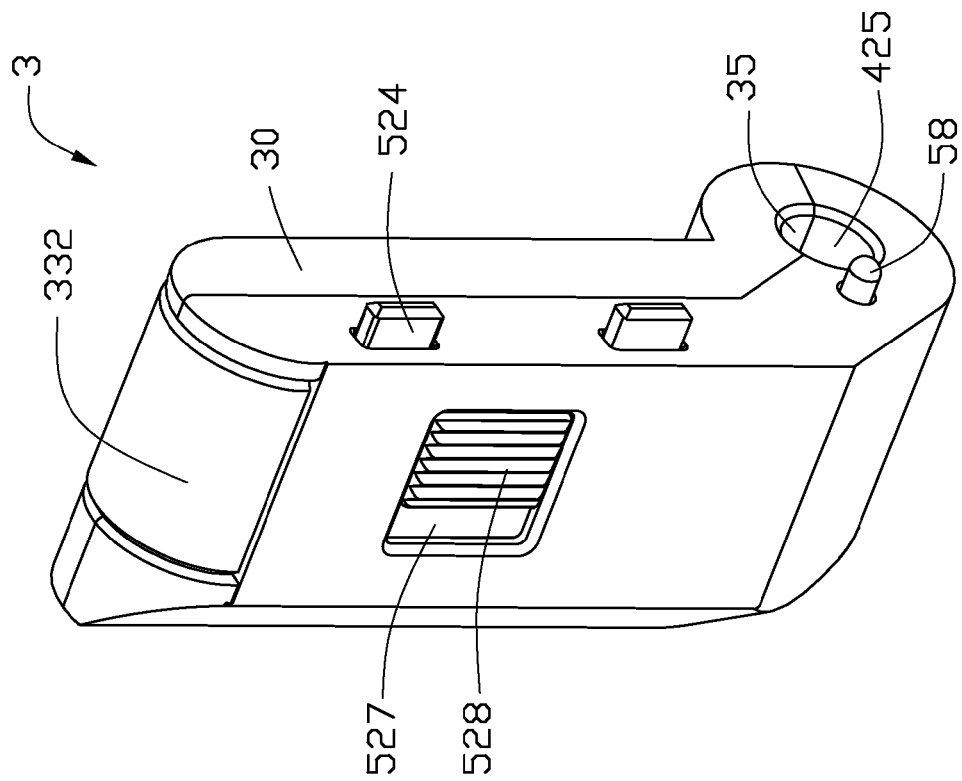
FIG. 5 is an assembled, isometric view of FIG. 4, but viewed from another perspective.

Referring to FIGS. 4 and 5, when assembling the bracket 3, the locating element 58 fits about the spring 56 via the second end of the locating element 58. The second end of the locating element 58 passes through the shaft hole 544 of one of the legs 542 of the fixing element 50, from a space between the legs 542. The locating element 58 deforms the spring 56, with the first end of the locating element 58 passes through the shaft hole 543 of the other one of the legs 542 from the space between the legs 542. Therefore, the stopping portion 582 of the locating element 58 resists against the leg 542 defining the shaft hole 543, and the spring 56 is accommodated between the leg 542 defining the shaft hole 544 and the stopping portion 582. The fixing element 50 is received in the back cover 40. The first end of the locating element 58 passes through the hole 424 of the back cover 40. The blocks 524 of the first fixing portion 52 pass through the corresponding receiving holes 422 of the back cover 40. The operation portion 528 is exposed through the opening 411 of the back cover 40. The posts 413 of the back cover 40 pass through the corresponding sliding holes 522 of the fixing element 50. Two screws 80 are screwed in the screw holes 412 of the corresponding posts 413, to mount the first fixing portion 52 between heads of the screws 80 and the back board 41. The elastic element 60 is mounted between the first fixing portion 52 and the fixing block 45. The pins 428 of the fixing block 45 are engaged in the corresponding holes 62 of the elastic element 60. The main wall 61 of the elastic element 60 resists against the fixing block 45. The distal ends of the sidewalls 63 of the elastic element 60 resist against a second side 525 opposite to the first side 523 of the first fixing portion 52. The blocks 524 of the fixing element 50 extend out of the back cover 40 through the corresponding receiving holes 422. The first end of the locating element 58 extends out of the back cover 40 through the hole 424 of the back cover 40. The posts 413 of the back cover 40 are located at the first terminals 5221 of the corresponding sliding holes 522 of the fixing element 50.

Figure 6:
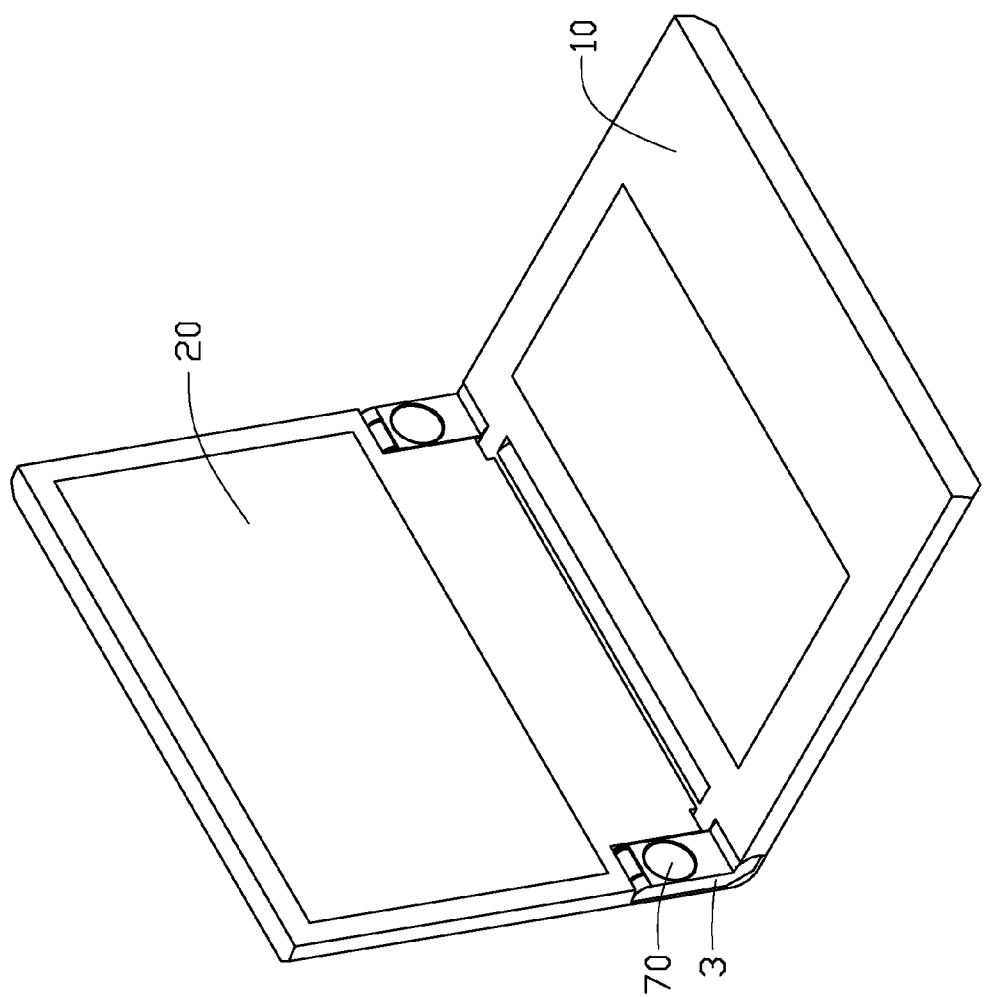
FIG. 6 is an assembled, isometric view of the notebook computer of FIG. 1.

Referring to FIG. 6, in assembling each combined assembly of the back cover 40 and the corresponding locating device 4 in the base 10, the blocks 524 of the fixing element 50 is inserted into the corresponding slots 224 of the display 20. The first end of the locating element 58 is received in the sliding slot 163 of the base 10. A half of the end of the pole 25 is received in the recessed portion 425 of the back cover 40, with the fixing hole 26 of the pole 25 aligning with the through hole 426 of the back cover 40. A screw (not shown) is screwed in the fixing hole 26, to pivotably mount the back cover 40 to the pole 25. The first end of the locating element 58 is located at a bottom of the sliding slot 163. An LED is mounted in the depressed portion 34 of the front cover 30, with a power line of the LED connected to the switch 36. The shield 70 is attached to the front cover 30, to cover the depressed portion 34. The front cover 30 is received in the first and second receiving spaces 141 and 222. The other half of the end of the pole 25 is received in the recessed portion 35 of the front cover 30. The latching portion 332 of the front cover 30 is latched to the latching slot 432 of the back cover 40. Therefore, the front cover 30 is mounted to the back cover 40. The power line of the LED is connected to a power line received in the base 10 through the sliding slot 163, to receive a voltage to power the LED.

In other embodiments, when the upper surface of the base 10 needs not to be lighted, the sliding slots 163 can be replaced with other locating holes defined in the second surfaces 162 of the protrusions 16, to fix the brackets 3.

Figure 7:
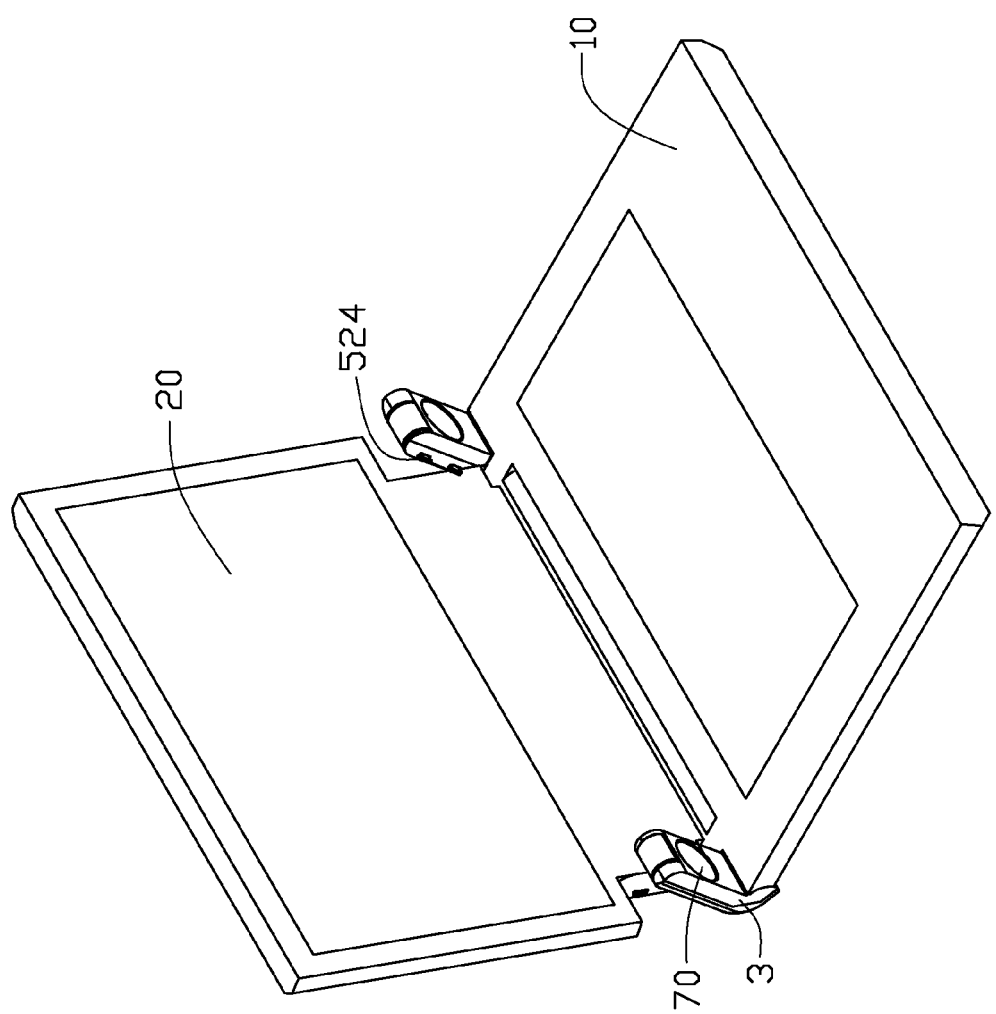
FIG. 7 is similar to FIG. 6, but showing a first using state.

Referring to FIG. 7, when using the notebook computer 100, the display 20 is pivoted an angle relative to the base 10. Each bracket 3 is received in the corresponding first and second receiving spaces 141 and 222. As shown in FIG. 7, the brackets 3 are initially located at a first position. When the LED needs to be turned on to light up the upper surface of the base 10, the operation portion 528 of the fixing element 50 is pushed towards the second board 421 of the back cover 40, until the blocks 524 of the fixing element 50 and the first end of the locating element 58 retract back into the back cover 40, the elastic element 60 being resisted by the fixing element 50. The posts 413 of the back cover 40 move from the first terminals 5221 to the second terminals 5222 of the sliding holes 522, and the blocks 524 of the fixing element 50 disengage from the slots 224 of the display 20. The brackets 3 are pushed to rotate towards the upper surface of the base 10. The operation portion 528 is released. The blocks 524 of the fixing element 50 extend out of the back cover 40 again under the restoring force of the elastic element 60, to resist the sidewall 232 of the second receiving space 222, until the blocks 524 are detached from the sidewall 232. The first end of the locating element 58 slides from the bottom to a top of the sliding slot 163. The brackets 3 is stopped being rotated. At this time, the brackets 3 may be located at a second position. The LED can be turned on via turning on the switch 36, to light up the upper surface of the base 10.

When the notebook computer 100 needs not to be lit up any more, the switch 36 is operated to turn off the LED. The operation portion 528 is pushed towards the second side board 421 of the back cover 40, and the brackets 3 are pushed to rotate away from the upper surface of the base 10, until the blocks 524 of the fixing element 50 resisting against the sidewalls 232 of the second receiving spaces 222 of the display 20. The operation portion 528 is released. The brackets 3 are further rotated away from the upper surface of the base 10, until the blocks 524 of each bracket 3 sliding into the corresponding slots 224 of the display 20. The first end of the locating element 58 moves from the top to the bottom of the sliding slot 163. The brackets 3 return to the first position.

Figure 8:
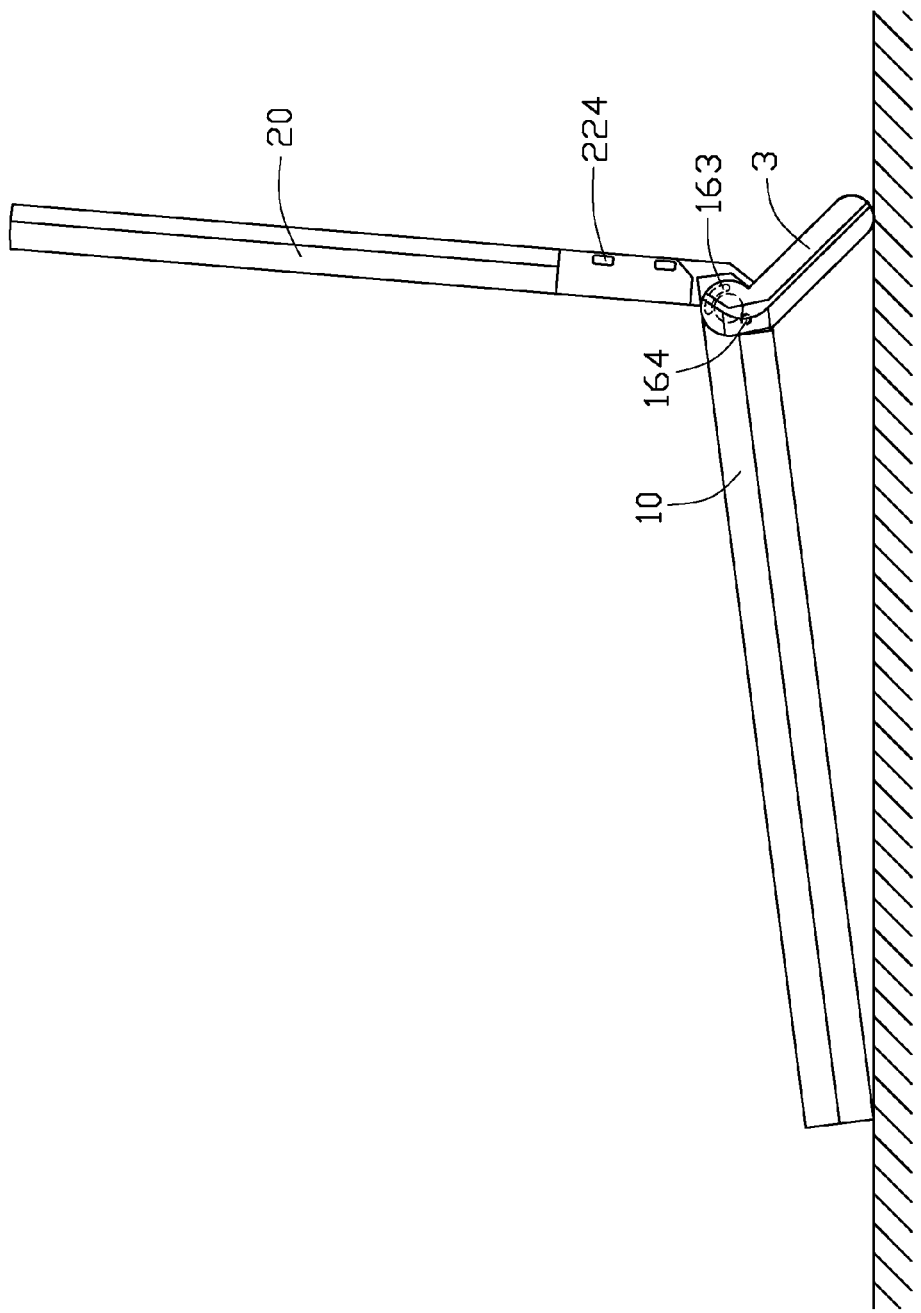
FIG. 8 is an assembled, plan view of the notebook computer of FIG. 1, showing a second using state.

Referring to FIG. 8, when using the notebook computer 100, the display 20 is lifted to form an angle between the display 20 and the upper surface of the base 10. The brackets 3 are received in the corresponding first and second receiving spaces 141 and 222, and located at the first position. When a back of the base 10 needs to be lifted, the operation portion 528 of the fixing element 50 is pushed towards the second side board 421 of the back cover 40, until the blocks 524 of the fixing element 50 and the first end of the locating element 58 retract back into the back cover 40, with the elastic element 60 resisted against the fixing element 50. The posts 413 move from the first terminals 5221 to the second terminals 5222 of the sliding holes 522, the blocks 524 of the fixing element 50 disengage from the slots 224 of the display 20, and the first end of the locating element 58 disengages from the sliding slot 163. The brackets 3 are rotated away from the upper surface of the base 10, with the blocks 524 of each bracket 3 resisting against the sidewall 232 of the corresponding second receiving space 222, and the first end of the each locating element 58 resisting the second surface 162 of the corresponding protrusion 16. The brackets 3 continue to be rotated away from the upper surface of the base 10, until the blocks 524 are detached from the sidewall 232, the first end of the locating element 58 resisting against the second surface 162 of the protrusion 16. The spring 56 is deformed. When the first end of the locating element 58 reaches the locating hole 164, the first end of the locating element 58 slides into the locating hole 164 under the restoring force of the spring 56. At this time, the brackets 3 are located at a third position to lift the back of the base 10.

When the back of the base 10 needs not to be lifted any more, the operation portion 528 of the fixing element 50 is pushed towards the second side board 421 of the back cover 40, until the blocks 524 and the first end of the locating element 58 retract back into the back cover 40, with the elastic element 60 resisted against the fixing element 50. The posts 413 moves from the first terminals 5221 to the second terminals 5222 of the sliding holes 522, and the first end of the locating element 58 disengages from the locating hole 164. The brackets 3 are rotated towards the upper surface of the base 10, until the blocks 524 of each bracket 3 resisting against the sidewall 232 of the corresponding second receiving space 222 under the restoring force of the elastic element 60. The first end of the locating element 58 extends out of the back cover 40 again under the restoring force of the elastic element 60 to resist against second surface 162 of the protrusion 16. When the blocks 524 reach the corresponding slots 224 of the display 20 and the first end of the locating element 58 reaches the sliding slot 163, the blocks 524 will slide into the corresponding slots 224 and the first end of the locating element 58 will slide into the sliding sot 163 under the restoring force of the elastic element 60. At this time, the brackets 3 are located at the first position again.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A notebook computer comprising:
a base defining two first receiving spaces in opposite sides of a back of the base;
a display pivotably connected to the back of the base, the display comprising two opposite sidewalls defining two second receiving spaces; and
two brackets each rotatably received and engaged in a corresponding first and a corresponding second receiving spaces, wherein the two brackets can be rotated along a rotating path, the rotating path comprising:
a first position at which the two brackets are received in the second receiving spaces of the display; and
a second position at which the two brackets disengage from the two second receiving spaces to form an angle with a bottom of the base to lift up the back of the base;
wherein each of the two brackets comprises a shell, a fixing element slidably received in the shell to engage with the display, a locating element engaged with the fixing element, and an elastic element mounted in the shell to resist against the fixing element and the shell, wherein the locating element comprises a first end extending out of the shell to engage with the base, an operation portion is formed on the fixing element, an opening is defined in the shell to expose the operation portion, wherein at the first position, the elastic element resists against the fixing element to make the fixing element engage with the display to fix the two bracket to the display; wherein when the bracket moves from the first position to the second position via operating the operation portion, to disengage the fixing element from the display, the elastic element resists against the fixing element to make the fixing element extend out of the shell, the locating element is engaged with the base to lift up the back of the base.

2. The notebook computer of claim 1, wherein two posts are formed from the shell, two sliding holes are defined in the fixing element to allow the two posts to pass therethrough, and to move from first terminals of the sliding holes to second terminals of the sliding holes, wherein the bracket is at the first position when the posts are at the first terminals, the bracket is at the second position when the posts are at the second terminals.

3. The notebook computer of claim 1, wherein at least one receiving hole is defined in a first sidewall of the shell, at least one block extends from a side of the fixing element, at least one slot is defined in each of the sidewalls of the display to allow the at least one block to pass through the at least one receiving hole to engage with the at least one slots.

4. The notebook computer of claim 3, wherein the fixing element comprises a first fixing portion and a second fixing portion extending from a bottom of the first fixing portion, a first through hole and a second through hole are defined a bottom the second fixing portion, the locating element is rotatably engaged in the first and second through holes, and fits a spring located between the first and second through holes and abuts the locating element.

5. The notebook computer of claim 4, wherein the at least one block extends from a first side of the first sidewall, the elastic element is mounted between a second side opposite to the first side of the first fixing portion and a second sidewall opposite to the first sidewall of the shell, to resist against the first fixing element and make the posts of the shell be located at the first terminals of the sliding slot of the first fixing element.

6. The notebook computer of claim 5, wherein two protrusions substantially perpendicularly extend from the back of the base, the display is pivotably connected to the two protrusions via a pole, two ends of the pole protrude into the corresponding first receiving spaces, a recessed portion extends from the first sidewall of the shell of each bracket towards the second sidewall of the shell to receive and engage with a corresponding end of the pole, a first and a second latching holes are defined in a surface facing the corresponding first receiving space of each protrusion, a hole is defined in the first sidewall of the shell to allow a first end of the locating element to pass therethrough to engage in the latching hole to locate the bracket at the first position, wherein the first end of the locating element is operable to be received the second latching hole to locate the bracket at the second position to lift up the back of the base.

7. The notebook computer of claim 6, wherein the shell comprises a front cover and a back cover engaged with the front cover, the fixing element, the elastic element, the locating element, and the spring are located between the front cover and the back cover.

8. The notebook computer of claim 7, wherein the back cover comprises a front board corresponding to the front board of the front cover, a top board extending upwards and frontwards from a top edge of the front board, corresponding to the top board of the front cover, a bottom board extending downwards and frontwards form a bottom edge of the front board, corresponding to the bottom board of the front cover, a first side board and a second side board extending backwards from two side edges of the front board, the top board, and the bottom board, the second recessed portion extends from the first side board near the bottom board toward the second side board to receive the two ends of the pole together with the first recessed portion.

9. The notebook computer of claim 8, wherein the rotating path further comprises a third position, each protrusion comprises a first surface facing the other protrusion and a second surface opposite to the first surface, a sliding slot is defined in the second surface of the two protrusions, a bottom of the sliding slot communicate with the first locating hole, a light emitter diode (LED) is mounted on the front cover, a switch is mounted on the front cover to turn on or off the LED, the two brackets move from the first position to the third position via operating the operation portion to make the first terminal of the locating element slides from the first locating hole to a top of the sliding slot, when the LED is turned on, an upper surface of the base is lighted.

* * * * *